United States Patent [19]

Jain et al.

[11] Patent Number: 5,675,742

[45] Date of Patent: *Oct. 7, 1997

[54] SYSTEM FOR SETTING CONGESTION AVOIDANCE FLAG AT INTERMEDIATE NODE TO REDUCE RATES OF TRANSMISSION ON SELECTED END SYSTEMS WHICH UTILIZING ABOVE THEIR ALLOCATED FAIR SHARES

[75] Inventors: Rajendra K. Jain, Sudbury; K. K. Ramakrishnan, Maynard; Dah-Ming Chiu, Lexington, all of Mass.

[73] Assignee: Digital Equipment Corporation, Maynard, Mass.

[ * ] Notice: The term of this patent shall not extend beyond the expiration date of Pat. No. 5,377,327.

[21] Appl. No.: 494,502

[22] Filed: Jun. 26, 1995

Related U.S. Application Data

[63] Continuation of Ser. No. 294,291, Aug. 23, 1994, Pat. No. 5,491,801, which is a continuation of Ser. No. 183,927, Jan. 21, 1994, Pat. No. 5,377,327, which is a continuation of Ser. No. 696,257, Apr. 30, 1991, abandoned, which is a continuation of Ser. No. 184,945, Apr. 22, 1988, abandoned.

[51] Int. Cl.$^6$ ............................. G06F 13/12; G06F 13/14
[52] U.S. Cl. .................... 395/200.13; 395/200.11
[58] Field of Search ...................... 364/200, 554; 379/279; 395/200, 200.13, 200.11; 370/94, 60

[56] References Cited

U.S. PATENT DOCUMENTS

| | | | |
|---|---|---|---|
| 4,044,337 | 8/1977 | Hicks et al. | 364/200 |
| 4,403,286 | 9/1983 | Fry et al. | 395/675 |
| 4,404,557 | 9/1983 | Grow | 370/455 |
| 4,472,784 | 9/1984 | Blachman | 364/554 |
| 4,475,192 | 10/1984 | Fernow et al. | 370/232 |
| 4,495,562 | 1/1985 | Yamaji et al. | 395/675 |
| 4,504,946 | 3/1985 | Raychaudhuri | 370/322 |
| 4,617,657 | 10/1986 | Drynan et al. | 370/394 |
| 4,663,706 | 5/1987 | Allen et al. | 395/200.13 |
| 4,677,616 | 6/1987 | Franklin | 370/232 |
| 4,707,832 | 11/1987 | Glenn et al. | 370/489 |
| 4,769,811 | 9/1988 | Eckberg, Jr. et al. | 370/236 |
| 4,769,815 | 9/1988 | Hinch et al. | 370/236 |
| 4,771,391 | 9/1988 | Blasbalg | 364/514 C |
| 4,779,267 | 10/1988 | Limb et al. | 370/394 |
| 4,788,721 | 11/1988 | Krishnan et al. | 379/221 |
| 4,792,941 | 12/1988 | Yanosy, Jr. et al. | 370/232 |
| 4,799,215 | 1/1989 | Suzuki | 370/227 |
| 4,809,318 | 2/1989 | Schoute | 379/279 |
| 4,849,968 | 7/1989 | Turner | 370/232 |

OTHER PUBLICATIONS

R.K. Jain et al., "A Quantitative Measure of Fairness and Discrimination for Resource Allocation in Shared Systems". DEC Technical Report TR-301 Digital Equipment Corporation Sep., 1984. (cited in DEC TR-510 Report, p. 30, reference [JCH84].

K.K. Ramakrishnan, "Analysis of a dynamic window congestion control protocol in heterogeneous environments including satellite links," in Proceedings of the Computer Networking Symposium, Nov. 1986. (cited in DEC TR-508 Report, p. 32 reference [Ram86].

Raj Jain, "Using Simulation to Design a Computer Network Congestion Control Protocol," Proc. Sixteenth Annual Modeling and Simulation Conference, Pittsburgh, PA., Apr. 1985. (cited in DEC TR-507 Report, p. 37, reference [12].

Raj Jain, "Divergence of Timeout Algorithms for Packet Retransmission," Proc. Fifth Annual International Phoenix Conf, on Computers and Communications, Scottsdale, Az., Mar. 26-28, 1986 pp. 174-179. (cited in DEC TR-507 Report, p. 38, reference [13].

(List continued on next page.)

Primary Examiner—Thomas C. Lee
Assistant Examiner—Le Hien Luu
Attorney, Agent, or Firm—Cesari and McKenna, LLP

[57] ABSTRACT

Method and apparatus for operating a digital communication network to avoid congestion by detecting load conditions at intermediate stations exceeding an overload condition, and flagging information packets associated with those streams of traffic accounting for more than their fair share of throughput at such overloaded stations.

35 Claims, 3 Drawing Sheets

OTHER PUBLICATIONS

R.K. Jain, "A Dynamic Window Congestion Control Scheme for Digital Network Architecture," DEC Res. Rep. TR–275, Jun. 1983 cited in R. Jain, Timeout–Based Congestion Control Scheme for Window Flow–Controlled networks on p. 1167, reference [4]).

R.K. Jain, "CUTE: A Timeout–based Congestion Control Scheme for Digital Networking Architecture," DEC Res. Rep. TR–353, Apr. 1985, (cited in R. Jain, Timeout–Based Congestion control scheme for Window Flow–Controlled Networks, on p. 1167, reference [7]).

Jain et al., "Congestion Avoidance in Computer Networks With a Connectionless Network Layer," DEC–TR–506 (Jun. 1987).

Jain et al., "Congestion Avoidance in Computer Networks With a Connectionless Network Layer Part I: Concepts, Goals, and Methodology," (Aug. 1987) DEC–TR–507.

Ramakrishnan et al., "Congestion Avoidance in Computer Networks With a Connectionless Network Layer Part II: An Explicity Binary Feedback Scheme," DEC–TR–508 (Aug. 1987).

Chiu et al., "Congestion Avoidance in Computer Networks With a Connectionless Network Layer Part III: Analysis of the Increase and Decrease Algorithms", DEC–TR–509 (Aug. 1987).

Ramakrishnan et al., "Congestion Avoidance in Computer Networks with a Connectionless Network Layer Part IV: A Selective Binary Feedback Scheme for General Topologies," DEC–TR–510 (Nov. 1987).

Giessler et al., "Free Buffer Allocation—An Investigation by Simulation," Computer Networks 2 (1978) 191–208.

Majithia et al., "Experiments in Congestion Control Techniques," as presented at International Symposium on Flow Control in Computer Networks at Versailles, France, Feb. 12–14, 1979, and published by North–Holland Publishing Company (1979).

Ahuja, "Routing and flow control in Systems Network Architecture," IBM Syst J, vol. 18, No. 2 (1979).

Gerla et al., "Flow Control: A Comparative Survey," IEEE Transactions on Communications, vol. Com. 29, No. 4 (1981).

Jaffe, "Flow Control Power is Nondentralizable," IEEE Transactions on Communications, vol. Com. 29, No. 9 (Sep. 1981).

Nagle, "Congestion Control in IP/TCP Internetworks," Ford Aerospace and Communications Corporation (Jan. 6, 1984).

Bux et al., "Flow Control in Local–Area Networks of Interconnected Token Rings," IEEE Trans. on Comm., vol. Com. 33, No. 10 (Oct. 1985).

Jain, "A Timeout–Based Congestion Control Scheme for Window Flow–Controlled Networks," IEEE Journal on Selected Areas in Communications, vol. Sac. 4, No. 7 (Oct. 1986).

Anderson et al., "Flow–Balancing Congestion Control for Computer Networks" IBM Technical Disclosure Bulletin, vol. 25, No. 1, Jun. 1982.

Anderson et al, "Flow–Balancing Congestion Control for Computer Networks" by IBM TDB, Jun. 1982, pp. 174–178.

SYSTEM FOR SETTING CONGESTION AVOIDANCE FLAG AT INTERMEDIATE NODE TO REDUCE RATES OF TRANSMISSION ON SELECTED END SYSTEMS WHICH UTILIZING ABOVE THEIR ALLOCATED FAIR SHARES

This is a continuation of application Ser. No. 08/294,291 filed on Aug. 23, 1994, U.S. Pat. No. 5,491,801; which is a continuation of application Ser. No. 08/183,927 filed on Jan. 21, 1994, U.S. Pat. No. 5,377,327; which is a continuation of application Ser. No. 07/696,257 filed on Apr. 30, 1991, abandoned; which is a continuation of application Ser. No. 07/184,945 filed on Apr. 22, 1988, abandoned.

FIELD OF THE INVENTION

This invention relates generally to the field of computer networks, and particularly to a congestion avoidance scheme for computer networks.

BACKGROUND OF THE INVENTION

In general terms, a computer network is a collection of end systems interconnected through one or more routers. Generally, the end systems both send data to other end systems on the network and receive data sent by other end systems on the network. When an end system is a sender of data, it is referred to as a source for that data; whereas, when it is a receiver of data, it is referred to as a destination for the data. Typically, end systems act as both sources and destinations depending upon whether they are sending or receiving data. When acting as a source, the end system sends data in the form of messages over a communication link to a router, which is also known as an intermediate system or gateway. Emanating from the router are a number of other communication links, each one representing a connecting path over which messages can flow back and forth to other routers and end systems within the network. Essentially, the router is a switching element which processes messages by transferring the messages arriving over one link onto another link for transmission to an end system or another router.

Each message comprises a sequence of information bits. Typically, however, the messages sent over the network are not sent as a continuous, uninterrupted stream of bits. Rather, they are divided up into smaller blocks of information called packets, which are then transmitted individually. Each packet has a predetermined maximum length. In addition to a data field which contains the data to be transferred, a packet also includes a header field which contains control information such as format, identifiers which indicate what portion of the message is contained in the packet, the source of the packet and the intended destination of the packet. When the packets which together contain a message reach the destination, the destination processes them by assembling their data fields into proper order to reconstruct the full message.

An important design objective in networks is controlling the flow of packets so that they will not be transmitted at a faster rate than they can be processed by the routers through which the packets will pass or by the destinations. Even in the simplest network consisting of two end systems interconnected by a router, the source may flood the destination if it transmits packets faster than they can be processed by the destination. In more complicated networks consisting of many end systems, numerous routers and alternative communication paths between the end systems, the likelihood of problems from excess communication traffic is significantly greater. This becomes especially true as the number of active end systems on the network increases and if communication speeds of the equipment within the network are mismatched. A mismatch may exist if, for example, a router cannot transfer packets as fast as they are being sent to it by the source. A mismatch may also exist between the speed at which the link can transmit packets, namely the link speed, and the rate at which the router can transfer packets. Predictably, as the complexity of the network increases, achieving an acceptable traffic control also becomes more difficult.

On most networks, at least two basic mechanisms are normally used for dealing with excess traffic arriving at a destination. One mechanism involves the use of buffers and the other involves flow control. In buffered systems, both the routers and the end systems are provided with buffer memory to handle overloads. Arriving traffic which exceeds the processing rate of the device is temporarily stored in the buffer memory until the device can process it. Buffers offer a satisfactory solution to excess traffic problems only if the overload is transitory. If the overload persists for too long, the buffers may become full after which the additional packets are rejected or destroyed.

The other mechanism, generally referred to as flow control, deals with the allocation of resources at the destination, such as memory and processing. Generally, in accordance with flow control, the destination sets a limit on the rate at which each source sending data to the destination may transmit that data. The sources and the destinations coordinate the transfer of data by an exchange of messages containing requests and acknowledgements. Before the source starts sending packets, it will send a request to the destination seeking permission to begin transmission. In response to the request, the destination sends a message containing an identification of the number of packets the source may dispatch toward the destination without further authorization. This number is commonly referred to as the window size. The source then proceeds to transmit the authorized number of packets toward the destination and waits for the destination to verify their receipt. After the destination successfully receives a packet, it sends a message back to the source containing an acknowledgement indicating the successful receipt of the packet and, in some cases, authorizing the source to send another packet. In this way, the number of packets on the network traveling from the source toward the destination will never be more than the authorized window size.

Neither of these mechanisms, however, satisfactorily deals with the distribution of traffic within the network. Even with these mechanisms in place, on a busy network it is likely that many sources will simultaneously send traffic over the network to more than one destination. If too much of this traffic converges on a single router in too short a time, the limited buffer capacity of the router will be unable to cope with the volume and the router will reject or destroy the packets. When this happens, the network is said to be congested.

When the network is congested, network performance degrades significantly. The affected sources have to retransmit the lost or rejected packets. Retransmissions, however, necessarily use network resources such as buffer storage, processing time and link bandwidth to handle old traffic thereby leaving fewer resources for handling those portions of the messages still waiting to be transmitted for the first time. When that occurs, network delays increase drastically and network throughput drops. Indeed, since some network resources are being dedicated to handling retransmissions at a time when the network is already experiencing a heavy load, there is a substantial risk of the congestion spreading and locking up the entire network. As a consequence, it takes the network much longer to extricate itself from congestion than to get into it.

A variety of alternative approaches exist for dealing with network congestion. Generally, the approaches fall into two categories. One category involves placing limitations on the amount of traffic which will be permitted on the network at any given time. The other category involves methods of limiting the spread of congestion once it occurs and then extricating the network from its congested state.

An approach which falls under the first category is the isarithmic method. According to this approach, a user can send a packet over the network only if it has a permit. There are, however, only a limited number of available permits to be shared by all end systems on the network. As a result, the number of packets on the network at any one time is also limited. A proper choice of the number of available permits significantly reduces the likelihood of congestion. The price paid for this method of control, however, is substantial. First, this method may yield an inefficient use of network resources. To protect against the possibility of traffic converging on a single router and causing congestion, network traffic must be limited to a level which is significantly below network capacity. Thus, a slow router may impact end systems that do not even have traffic flowing through that router. Secondly, distributing permits becomes a serious problem. While inactive end systems are holding onto permits, other end systems who need them cannot use the available network resources. And third, the method really does not address the distribution of traffic on the network which is the real cause of network congestion.

Another example from the first category involves the preallocation of buffers at the routers. This approach is used on networks which create a virtual circuit through the router to handle communications between two end systems. A virtual circuit is essentially a channel over the network which is dedicated to handling only the communications between the two end systems and which appears as though it is an actual physical circuit. The virtual circuit, however, is not an actual physical circuit connecting the two end systems but rather is a mechanism for transporting messages between them. When the network establishes the virtual circuit between two end systems, routers along the path over which the packets will pass set aside buffers and other router resources to handle only the traffic between the two end systems. By preallocating buffers in this manner, the routers will always have memory available to store arriving packets until they can be forwarded. As with the isarithmic method, a major drawback to this approach is that it is inefficient. Even during periods of inactivity, buffers and other router resources committed to one virtual circuit cannot be used to handle packet transfers associated with communications between other end systems.

The second category of approaches for dealing with network congestion is commonly referred Go as congestion control. Congestion control typically involves feedback which signals the onset of congestion and instructs end systems to decrease the rate at which they initiate transmission of packets. Under one approach, the routers send special messages, commonly referred to as "choke packets" or "source quench packets", to the sources, requiring the sources to reduce their traffic on the network. To determine which sources are to receive the choke packets, the router monitors its communication links to detect when their utilization rates rise above a preselected threshold level. When the threshold level is exceeded, the router sends a choke packet back to the sources that generated the packets which are arriving at the router. In response, the sources decrease their output. The most obvious disadvantage of this approach is that it requires adding traffic, in particular, the choke packets, to the network at a time when the network is least able handle the added traffic. A second disadvantage is it penalizes sources which may not be significant contributors to the traffic overload.

Another method of congestion control which has been used is delay sensitive routing. According to this method, the routers maintain tables which indicate the delays associated with the different paths passing through them. As traffic moves through the network, paths are selected by the routers to yield the lowest delays to the intended destinations. To update the delay tables maintained by the routers, the routers periodically measure the delays on the various paths and then communicate the delay information to each other over the network. As with the previous method, delay-sensitive routing requires adding traffic to the network, which may not be desirable. In addition, delays may vary too quickly to provide an effective method for routing. Moreover, any attempt to keep them current results in high overhead due to the large volume of required updating activity and the inter-router communication of delay information.

A third approach to congestion control involves piggy-backing the feedback information onto packets which are traveling back in the direction from which the traffic causing the congestion is coming. Unlike the previous two examples, this does not result in additional traffic. However, the drawback to the approach is that the reverse traffic may not be going to the sources which are the cause of or even participants in the congestion on the forward path.

SUMMARY OF THE INVENTION

The invention provides a new and improved mechanism, and associated method, for avoiding congestion on a network. The responsibility for implementing the method is distributed throughout the network and is shared by the routers and the end systems. In accordance with the invention, each router, independent of the other routers in the network, seeks to constrain the total traffic which it handles, i.e. its load, to within a region of optimum performance for that router.

The method comprises two processes, namely, a feedback process, which is implemented by routers in the network, and a control process, which is implemented by the end systems in the network. In performing the feedback process, a router determines the existence of an overload condition by detecting when it is operating beyond an estimated capacity level, it calculates a fair share of the estimated capacity level for each end system sending packets to the router and then, it identifies which end systems are sending more than a fair share of traffic received by the router. By conditioning a flag in the packets coming from the identified end systems, the router generates feedback indicating that the identified end systems are contributing to the overload condition in the router and that they should decrease their output.

The router transfers the packet carrying the information contained in the flag on toward its intended destination. After the destination receives the packet, it responds in one of two ways depending upon how the invention is implemented. If the destination has responsibility for processing the information contained in the flag, the destination will determine how the source should adjust its output by performing the control process and then feed this determination back to the source in a message carrying the acknowledgement. On the other hand, if the source has responsibility for processing the information contained in the flag, the destination will transfer the flag to the message carrying the acknowledgement back to the source and the source will then determine how it should adjust its output by performing the control process.

In accordance with the control process, the end system monitors the congestion avoidance flags which it receives to determine whether corrective action is called for. If the condition of the flags indicates that corrective action is called for, the end system implements a load adjustment algorithm which causes the rate at which the source is transmitting packets onto the network to decrease. If, however, the condition of the flag indicates that no corrective action is called for, the load adjustment algorithm permits the rate at which the source is transmitting packets to increase.

BRIEF DESCRIPTION OF THE DRAWINGS

The invention is pointed out with particularity in the appended claims. The above, and further, advantages and aspects of this invention may be attained by referring to the following detailed description taken in conjunction with the accompanying drawings, in which:

DETAILED DESCRIPTION OF AN
ILLUSTRATIVE EMBODIMENT

Figure 1:
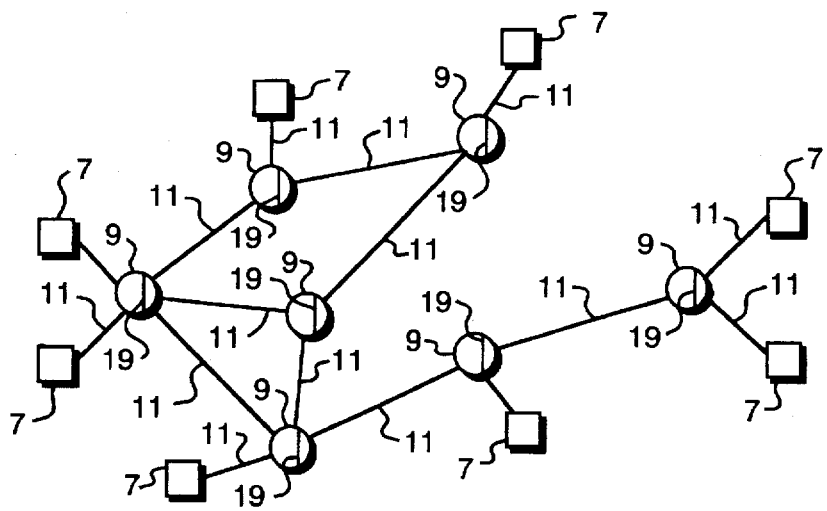
FIG. 1 depicts the organization of a network constructed in accordance with the invention.

With reference to FIG. 1, a network comprises a plurality of end systems 7 interconnected through a matrix of routers 9, which are also known as intermediate systems or gateways. The end systems 7 communicate with each other over the network by sending data or messages to each other. When an end system 7 sends data to another end system 7, it is referred to as a source for the data. On the other hand, when the end system 7 receives data, it is referred to as a destination for the data. Since many end systems 7 can both send and receive data, they may function as either a source or a destination.

The end systems 7 and the routers 9 are interconnected by links 11 over which they transmit the data and other information. Each router 9 receives data from a source 7 or another router 9 on one link 11 and switches it to another link 11 for transmission to another router 9 or a destination 7, thereby establishing a path connecting a source with the destination intended to receive the transmitted data. Each router 9 may include one or more buffers 19 to temporarily store data sent to it by the sources 7.

Figure 2:
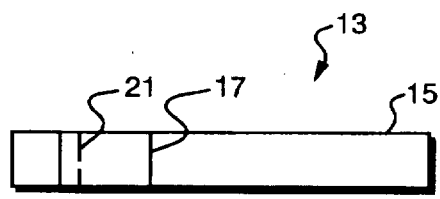
FIG. 2 depicts the structure of a packet transmitted by an end system shown in FIG. 1.

Data travels over the network in the form of messages. Each message, in turn, comprises a number of packets 13, each of which includes a data portion 15 and a header 17, as illustrated in FIG. 2. Before a source 7 can send packets 13 to a destination 7, it will generally obtain from the destination an indication of the number of packets 13 which it may transmit onto the network without further authorization from the destination. This number represents a maximum window size, which effectively sets an upper limit on the rate at which the source 7 can send packets to the destination 7. The source 7 then transmits the authorized number of packets and waits for the destination 7 to indicate that each packet 13 has been successfully received. As the destination 7 receives packets 13, it sends back to the source 7 a return message carrying an acknowledgment which indicates successful receipt of the packets 13 and which may permit the source to send one or more additional packets 13. However, the number of packets 13 on the network traveling toward the destination 7 at any one time will not exceed the maximum authorized window size.

Each packet 13 passing through a router 9 is part of a corresponding stream of traffic. In the embodiment described herein, each stream of traffic consists of all packets 13 passing through the router 9 which are associated with the communication between a specific source and a specific destination, that is, each packet 13 corresponds to a particular source-destination pair (hereinafter referred to as an S-D pair). A stream of traffic, however, may be defined in other ways depending on the desired traffic control objectives for the network. For example, each stream of traffic may consist of all packets arriving at the router 9 over a corresponding link 11, or it may consist of all packets leaving the router 9 over a corresponding link 11. As will become apparent later, the definition of a stream of traffic at the router 9 relates to how one wishes to allocate the limited resources of the router among the end systems on the network.

In accordance with the invention, each packet 13 includes a congestion avoidance flag 21, which is a field located in the header 7. The congestion avoidance flag 21 is used by the router 9 to indicate to the end systems whether the router is operating beyond an estimated capacity level. The congestion avoidance flag 21 is used in the following way. When a source 7 sends a packet 13 onto the network, the source 7 clears the congestion avoidance flag 21. Then, in accordance with a feedback algorithm, described below in connection with FIG. 4, each router 9 monitors its load, which is the total number of packets 13 it receives per unit time from all end systems sending traffic through the router 9, and it determines when that load exceeds the estimated capacity level, beyond which the likelihood of congestion may increase. When the router 9 detects that its load exceeds the estimated capacity level, it calculates a fair share of the estimated capacity for each stream of traffic passing through the router 9 and then conditions the flag 21 on each packet associated with any stream of traffic that accounts for more than the calculated fair share of the estimated capacity for that stream. The flags 21 on all other packets 13 passing through the router 9 are permitted to pass undisturbed.

In one embodiment, the destination 7 transfers the flag 21 from each incoming packet 13 to the return message carrying the acknowledgment which it then sends back to the source. In this way, the information placed in the flag 21 by the router 9 is fed back to the source 7 which can then act upon that information. The sources 7, in response, interpret the information presented in the flags 21 of incoming return messages carrying the acknowledgements and adjust their throughputs in accordance with a control algorithm described below in connection with FIG. 5.

In the embodiment described herein, the field which contains the congestion avoidance flag 21 comprises a single bit. It may, however, comprise more than one bit if, for example, it is desirable to use the flag 21 to convey more information about the operating point of the router 9 than can be conveyed using a single bit.

Figure 4:
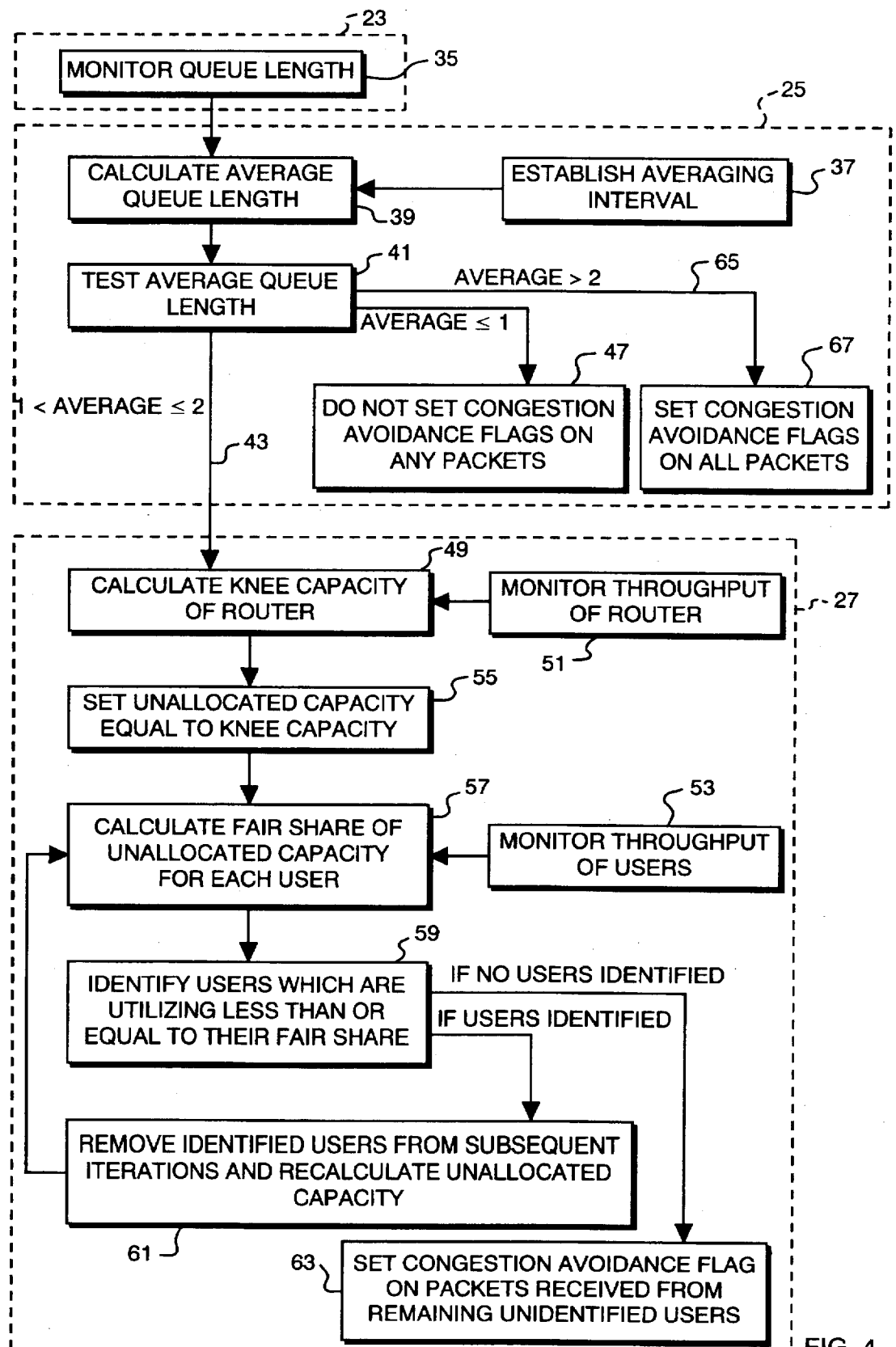
FIG. 4 depicts a flow diagram illustrating the operation of a router shown in FIG. 1.

As shown in FIG. 4, the feedback algorithm, which is performed by the routers 9, includes three separate functions, namely, a detection function 23, a filter function 25 and a feedback selection function 27. The detection function 23 provides an indication of overload on the router 9. The filtering function 25 determines when the overload has lasted long enough to justify corrective action. And the feedback selection function 27 identifies the end systems 7 which are responsible for the overload condition and enables the router 9 to set the congestion avoidance flag 21 in packets 13 being transmitted by those end systems 7, thereby requesting them to reduce their load demands.

Figure 3A:
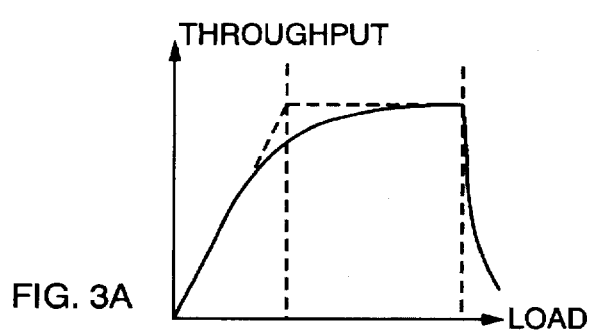
FIGS. 3A, 3B and 3C depict graphs useful in understanding the invention.
Figure 3B:
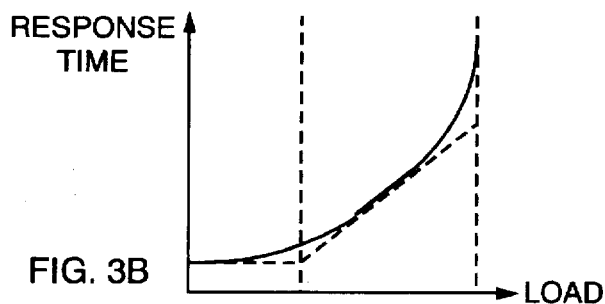
Figure 3C:
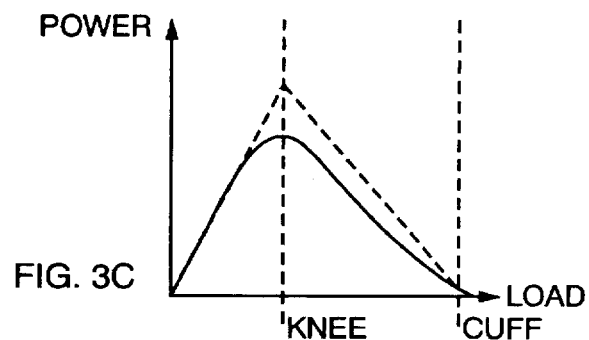

By way of background, the overload condition used in connection with the detection function 23 is defined in terms of router performance which can be expressed by three variables, namely, throughput, response time and power as a function of load. In general terms, throughput is the number of packets 13 per unit time that the router 9 transfers from an incoming link to an outgoing link 11. Response time is the time it takes for the router 9 to process an incoming packet 13. And power is throughput divided by response time. FIGS. 3A,3B and 3C illustrate typical performance curves for each of these variables.

As illustrated in FIGS. 3A, 3B and 3C, the curves for these three variables as a function of load typically have two key points, namely, a knee and a cliff. The location of each of these points is dependent upon, among other things, the service rate of the router 9, which is the rate at which the router can process a packet, i.e. transfer an incoming packet onto an outgoing link. Below the knee, the total demand of all end systems 7 sending packets 13 through the router 9 is less than the service rate; therefore, throughput tends to increase linearly with load while response time remains relatively constant. Above the knee, the total demand begins to approach the service rate with the result that the router's buffers 19 begin to fill up with packets being held until they can be transferred to their destinations. Thus, the rate of increase of throughput as a function of load begins to drop and the response time begins to increase significantly. Finally, at the cliff, which is located at a load level above the knee, the total demand exceeds the service rate such that the network experiences a state of congestion in which the router's buffers are full, packets are lost and retransmission is common. The cliff marks the load level at which the throughput begins to fall off precipitously and the response time begins to increase drastically.

The load level or throughput at the knee is referred to as the "knee capacity." The knee capacity represents an optimal load for router operation beyond which the router is operating in an overload condition and router efficiency declines. It is also the load level about which the invention urges each router to operate.

With this background, the router 9, as it is receiving and switching packets 13, also executes the feedback algorithm depicted in FIG. 4 to determine whether the rate at which it is receiving packets 13 exceeds the knee capacity. To accomplish this, the router 9 determines the queue length, which is equal to the number of packets which are stored in the buffers 19 waiting to be processed by the router 9 plus any packet which is being processed (step 35). The router 9 monitors queue length each time that the router receives a packet 13 and each time that it transmits a packet 13.

Using the monitored queue length, the router 9 executes the filter function 25 according to which it calculates an average queue length and then determines whether the average queue length equals or exceeds a preselected length. That is, after processing the filter function 25, the router has a value which is less sensitive to transitory peaks in queue length.

Figure 6:
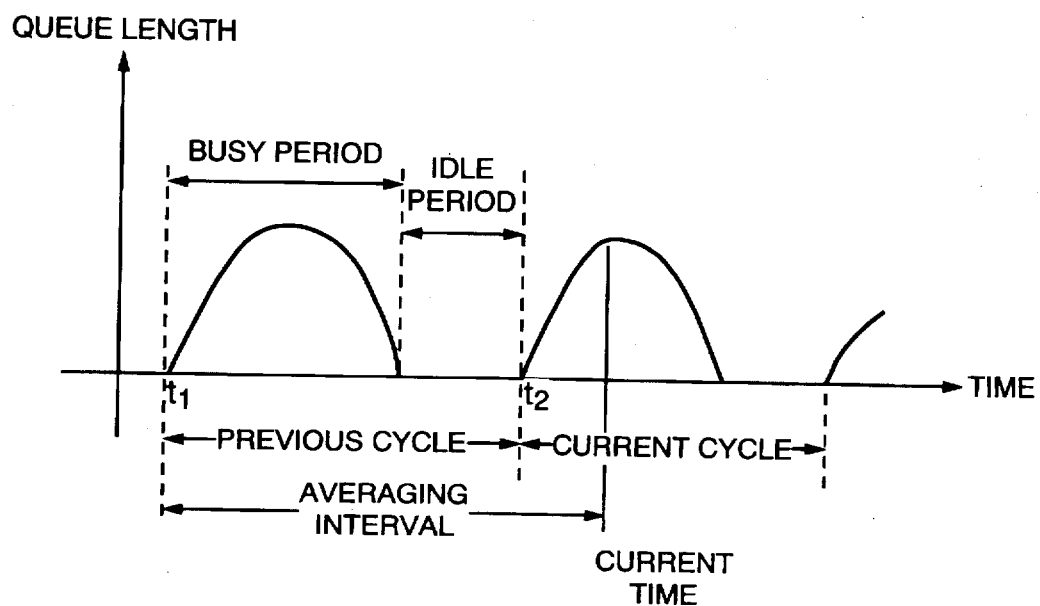
FIG. 6 depicts another graph useful in understanding the invention.

In accordance with one aspect of the invention, the router 9 calculates the average of the queue length by using what is referred to as an adaptive averaging scheme. That is, the beginning of the time interval over which the average is calculated advances as a function of the past packet activity at the router. Typically, transmissions of packets by end systems 7 occur in bursts and affect queue length at a router 9 in a manner such as is illustrated in FIG. 6. The times $t_1$ and $t_2$, which are designated as regeneration points, represent the points at which a packet 13 arrives at an idle router 9. The time between the regeneration points represents a cycle in the router's traffic and consists of a busy period followed by an idle period. The busy period is that period of time during which at least one packet is being served by the buffer 19. The idle period, on the other hand, is that period of time during which no packets are being served by the router 9. The averaging interval starts at the regeneration point for the previous cycle and ends at the current time in the current cycle. As the current cycle ends and a new cycle begins, the start of the averaging interval is shifted up one full cycle. In this way, the averaging interval always includes activity from the completed previous cycle as well as a portion of the current cycle. In executing step 37 of the filter function 25, the router 9 establishes the averaging interval in accordance with this method, and then, in step 39 the router 9 uses the averaging interval to calculate the average queue length.

Next, according to step 41 of the filter function 25, the router 9 tests the average queue length to determine whether it is greater than a preselected length. It has been determined that, regardless of whether the inter-arrival time distributions and the service time distributions for the router 9 are completely deterministic or exponential, the knee occurs when average queue length is equal to one. For other distributions, this is approximately true. Therefore, a preselected length equal to one is used in one specific embodiment. If the average queue length is greater than one but less than or equal to an override level, the router 9 moves along branch 43 and invokes the feedback selection function 27 which identifies specific sources-destination pairs whose packet transmission rates through the router 9 (i.e. throughputs) should be reduced and sets the congestion avoidance flag 21 in all packets 13 associated with those S-D pairs. On the other hand, if the average queue length is less than or equal to one, the router 9 does not invoke the feedback selection function 27 and, instead, moves along branch 45 to step 47 in which the router allows all packets 13 to pass through without disturbing their flags 21.

In accordance with another aspect of the invention, the router 9 overrides the feedback selection function 27 if the load at the router 9 becomes too large. The override is carried out in connection with step 41 of the filter function 25. Specifically, if the average queue length from step 39 exceeds an override level, which is set at two in one embodiment, the router 9 sequences along branch 65 to step 67. In step 67, the router 9 conditions the congestion avoidance flags 21 on all packets 13 processed by the router 9. Of course, different override levels can be selected depending upon the desired performance characteristics of the system. In any event, the override level is established to reduce the risk of congestion due to load increases that occur too rapidly for the selective feedback function 27 to adequately respond to them.

In accordance with the feedback selection function 27, to identify the S-D pairs whose throughputs should be reduced, the router 9 first calculates the knee capacity for the router (step 49) and then, iteratively calculates a share of the knee capacity to be allocated to each S-D pair. Typically, the knee capacity is some fraction of the service rate of the router 9. Therefore, the router 9 calculates its knee capacity by first approximating its service rate and then, multiplying that approximation by a capacity factor which represents that fraction. Depending upon the character of the inter-arrival time distribution, the capacity factor lies between zero and one. In one embodiment, a capacity factor close to one led to better performance, so the capacity factor was set at 0.9.

The router 9 approximates the service rate by monitoring its average throughput (step 51). During the periods when the average queue length equals or exceeds one, the rate at which the router 9 transmits packets is limited by the service rate of the router 9. Thus, average total throughput at the router is generally a good measure of service rate. In arriving at the average total throughput, the same averaging interval is used as was used in the adaptive averaging scheme described above in connection with the filter function 25.

Based upon the calculated knee capacity, the feedback selection function 27 Allocates a portion of this knee capacity to each of the S-D pairs according to a fairness criterion. In one embodiment, the selected fairness criterion has three objectives. First, it fully allocates the knee capacity to the S-D pairs currently sending packets 13 through the router 9. Second, to each S-D pair which accounts for a throughput that is less than or equal to the calculated fair share, it allocates a share of the knee capacity equal to present throughput for the S-D pair. And third, to each remaining S-D pair which accounts for a throughput that is greater than the calculated fair share, it allocates an equal share of the remaining, unallocated knee capacity. The feedback selection function 27 arrives at this distribution through an iterative procedure.

To implement the fairness criterion described above, the feedback selection function 27 monitors the throughput associated with each S-D pair sending packets through the router (step 53). That is, in step 53, the router 9 determines the total number of S-D pairs using the router 9 and it determines the average throughput for each of those S-D pairs. The averaging interval used to determine average throughput is the same interval as is used in the adaptive averaging scheme described earlier. The information from step 53 is then used to carry out the iterative procedure which is described next.

At the beginning of the iterative procedure, the router 9 treats knee capacity as an unallocated capacity (step 55). Then, in the next step 57, the router 9 divides the unallocated capacity by the total number of S-D pairs obtained from step 53 to arrive at a first estimate of a fair share for each S-D pair. After that, the router 9 compares the average throughput for each S-D pair, which was obtained from step 55, to the first estimate of the fair share to identify those S-D pairs accounting for throughputs that are less than or equal to the first estimate of the fair share (step 59).

If the router 9 identifies S-D pairs in step 59, then the router branches to step 61 in which it allocates to each identified S-D pair a share of the unallocated capacity which is equal to the current average throughput for that S-D pair. In other words, the router 9 permits all packets 13 associated with the identified S-D pairs to pass through the router 9 without disturbing their congestion avoidance flags 21. The identified S-D pairs are then removed from subsequent iterations of the fair share calculations and the unallocated capacity is adjusted by subtracting the allocated shares.

Following step 61, the router 9 branches back to step 57 and the procedure is repeated using the most recently calculated unallocated capacity. That is, the router 9 recalculates in step 57 a revised estimate of fair share for each remaining S-D pair by dividing the unallocated capacity by the remaining number of unidentified S-D pairs. Next, the router 9 identifies the S-D pairs accounting for throughputs that are less than or equal to the revised estimate of fair share (step 59). As before, the identified S-D pairs are then removed from subsequent iterations (step 61) and the packets which are associated with those S-D pairs are permitted to pass through the router without disturbing their congestion avoidance flags 21.

The router 9 repeats this process until it cannot identify in step 59 any other S-D pairs that account for throughputs at the router 9 which are less than or equal to the most recently calculated revised estimate of fair share. The group of remaining unidentified S-D pairs then represents all S-D pairs accounting for throughputs which are larger than the fair share which was calculated for them. At that point in the algorithm, the router 9 branches to step 63 in which it sets the congestion avoidance flag on all packets 13 associated with the unidentified S-D pairs.

It will be appreciated that, while one particular fairness criterion has been described, other fairness criteria are certainly possible and fall within the scope of this invention. The choice depends upon the desired priorities and objectives for communications on the network. For example, the streams of traffic passing through the router have been defined in terms of the throughputs which are associated with S-D pairs. By defining the streams of traffic differently, a different allocation of router capacity can be achieved. For example, if a stream of traffic consists of all packets arriving at the router over a link regardless of their point of origin, then the router operating in accordance with this definition can allocate its limited capacity on a per link basis. In addition, the described criterion achieves an equal allocation of available router capacity to each stream of traffic. An alternative criterion might involve giving priority to certain streams of traffic. Under that alternative, during periods of router overload, some streams would be permitted to have a proportionally larger share of the router's capacity than other streams.

Figure 5:
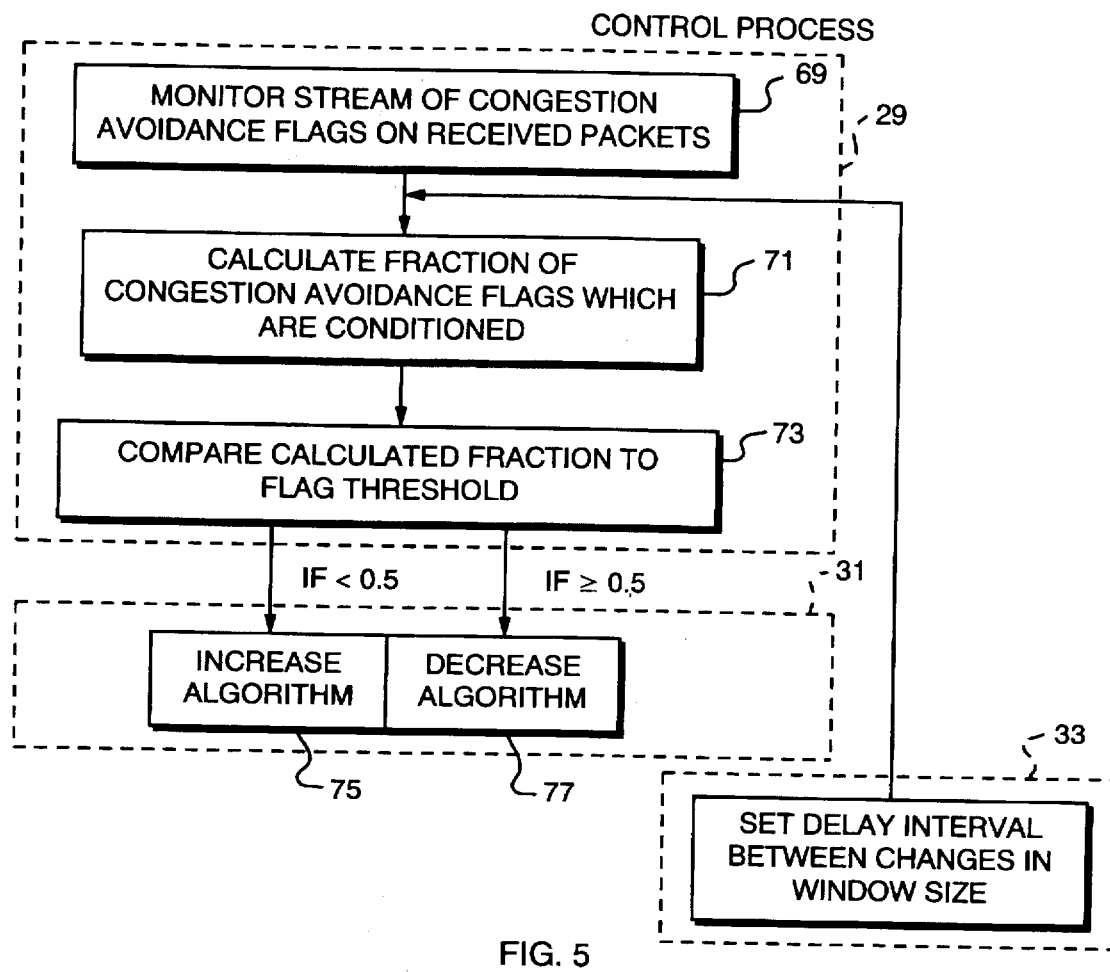
FIG. 5 depicts a flow diagram illustrating the operation of an end system shown in FIG. 1.

During periods of router overload, the router 9 sets the flag 21 on certain packets 13 in accordance with the approach described above. As a consequence, certain sources 7 will ultimately receive a sequence of packets some or all of whose flags 21 are set, thereby indicating that communications associated with that source are contributing to a stream of traffic which is accounting for more than a fair share of the limited capacity available at the router 9. The source 7 analyzes the sequence of congestion avoidance flags 21 which it receives to determine how to adjust its throughput. For this purpose, the source implements the control process consisting of three different algorithms, as shown in FIG. 5. First, the source 7 executes a signal filter algorithm 29 to filter the information contained in the sequence of congestion avoidance flags and to determine therefrom whether to allow an increase or require a decrease in window size. The source 7 also executes a decision frequency algorithm 33 which sets the amount of time which must elapse between changes in the size of the window.

Finally, when a change in window size is called for, the source 7 executes a load adjustment algorithm 31 which establishes the amount by which the window size will be increased or decreased.

Since communications over a network occur in bursts, the load on each router 9 in a network changes from moment to moment. Consequently, each source 7 sending packets over the network typically receives via the return messages a sequence of congestion avoidance flags 21, some of which are conditioned and some of which are cleared. In executing the signal filter 29, the source 7 essentially compresses the sequence of flags 21 into a single increase/decrease decision which is made at suitable intervals. To accomplish this, the source 7 monitors the sequence of flags 21 and counts the number of flags which are conditioned (step 69). After examining a predetermined number of consecutively received flags 21, equal in number to the current size of the source window, the source 7 calculates the fraction of flags which are conditioned (step 71) and then tests to determine if the calculated fraction equals or exceeds a flag threshold (step 73), which in one specific embodiment is 0.5. Of course, other thresholds may be selected depending upon desired performance goals. If the calculated fraction equals or exceeds the flag threshold, the signal filter algorithm 29 requests a decrease in the window size by branching to step 75 of the load adjustment algorithm 31. Otherwise, the filter algorithm 29 authorizes the window size to increase by branching to step 77 of the load adjustment algorithm 31.

The load adjustment algorithm 31 enables a source 7 to determine the amount by which the source window size is to change. In one embodiment, the algorithm adjusts the window size according to the following rules:

Increase: $w_{new} = w_{old} + 1$

Decrease: $w_{new} = 0.875 * w_{old}$

In these equations, $w_{old}$ is the previously used window size and $w_{new}$ is the new window size. According to these rules, each source 7 which is permitted to increase its window size may increase its window size by one packet. Whereas, each source 7 which is required to reduce its window size must reduce it by 0.125 times (i.e. to 0.875 times) its current window size. In other words, the sources 7 with larger windows decrease their window sizes by a greater amount than the sources with smaller window sizes. The multiplicative decrease leads to convergence on a fair allocation of the limited router resources.

In one embodiment, the sources 7 execute the load adjustment algorithm 31 in accordance with the following limitations. First, a source 7 limits the size of its window to the maximum window size permitted by agreement between the source and the destination. Secondly, a source 7 will not permit its window size to be reduced to less than one packet. Finally, each source 7 rounds off the calculated real value of the new window size to the nearest integer value and then uses the integer value for the actual window size. The calculated real value, however, is stored by the source 7 and used for the next execution of the load adjustment algorithm 31.

Of course, the rules presented above represent only one of many alternative approaches. The choice of an alternative approach depends on the desired performance characteristics for the network. Thus, for example, the increase and decrease rules may be of the following general linear forms:

Increase: $w_{new} = a * w_{old} + b$

Decrease: $w_{new} = c * w_{old} - d$ where the parameters a, b, c and d are chosen appropriately.

The decision frequency algorithm of the control process assures that window size changes do not occur too frequently. Thus, in executing the decision frequency algorithm 33, the source 7 waits an appropriate delay interval between the time of the last window change and the time at which a new change in window size is permitted. The delay interval allows sufficient time to elapse so that a change in window size has full impact on the state of the network and, consequently, on the congestion avoidance flags 21 received by the source 7. In one embodiment, the source 7 waits to receive a number of congestion avoidance flags 21 equal to approximately twice the window size. Specifically, after a change in window size has occurred, the source 7 counts the number of congestion avoidance flags 21 received. When the count equals the window size which was in effect prior to the change in window size, the source treats the elapsed time interval as the first phase of the delay interval. Then, the source 7 counts the next sequence of congestion avoidance flags 21. When the second count equals the current window size, the source 7 then permits a change in window size to occur. The source 7, in accordance with the signal filter algorithm 29, uses the information contained in the flags 21 received during the period of the second count to determine how the window size should change at the end of the delay interval. Of course, other delay intervals may be selected, again depending upon desired system response time.

In this description, the source 7 has been identified as the end system which performs the control process. This is not meant, however, to limit the invention to encompass only networks wherein sources perform the control process. Indeed, the control process 3 can be implemented by either the sources 7 or the destinations 7. If the destinations 7 execute the control process 3, then the destinations analyze the information contained in the congestion avoidance flags 21, calculate a new window size and Rend the new window size to the corresponding sources 7 via the return messages which may also carry the acknowledgement.

Furthermore, the invention has broader applicability than to the network described herein. Although the illustrative embodiment refers to a network on which throughputs are controlled by adjusting window size, no such limitation on the scope of the invention is implied by that choice. For example, the invention may also be used on networks in which throughputs are controlled by setting the rate at which an end system is permitted to transmit information.

The invention described herein represents a dynamic solution to network control. This is particularly important because network configurations and traffic are themselves highly dynamic in nature. Especially in large networks, sources and destinations use the network at frequent and unpredictable times. Furthermore, traffic tends to occur in very concentrated bursts. Thus, not only is the optimal operating point of the network constantly changing but the occurrence and causes of network overload cannot be anticipated. A static approach to network control would not be able to respond satisfactorily to the characteristically transitory situations and would undoubtedly imply a serious compromise to network performance.

In addition to being a dynamic solution to network control, the invention offers a number of other advantages. First, no additional traffic is added to the network to implement the control mechanism. Rather, the feedback process conveys overload information to end systems by using a flag located in the header of packets which are already being transmitted back and forth to convey data and acknowledgements. As a consequence, the feedback process does not exacerbate traffic overload conditions when it signals the need to reduce end system throughput. Second, traffic control is distributed throughout the network and does not require a central observer. Third, the embodiment of the invention described herein exhibits convergence to a stable load condition which is both efficient and fair. That is, if the total demand of all of the end systems remains stable and exceeds the knee capacity of any router, then the scheme brings the network to a stable operating point at which end systems get a fair share of the limited resource. In addition, the scheme brings overall throughput on the network to a level at which each router on the network is operating at or below its knee capacity. Moreover, the Window size control brings the network to its stable operating point with a minimum of oscillation. Finally, the scheme has proven to be relatively configuration independent and insensitive to the choice of parameters such as the flag threshold and the capacity factor.

Additional details regarding the feedback process, the control process, and the performance of networks embodying this invention are disclosed within the following documents each of which is incorporated herein by reference: Congestion Avoidance in Computer Networks with a Connectionless Network Layer, by Raj Jain, K. K. Ramakrishnan, and Dah-Ming Chiu, DEC Technical Report TR-506, Digital Equipment Corporation, June 1987; Congestion Avoidance in Computer Networks with a Connectionless Network Layer, Part I: Concepts, Goals, and Methodology, by Raj Jain and K. K. Ramakrishnan, DEC Technical Report TR-507, Digital Equipment Corporation, August 1987; Congestion Avoidance in Computer Networks with a Connectionless Network Layer, Part II: An Explicit Binary Feedback Scheme, by K. K. Ramakrishnan and Raj Jain, DEC Technical Report TR-508, Digital Equipment Corporation, August 1987; Congestion Avoidance in Computer Networks with a Connectionless Network Layer, Part III: Analysis of the Increase and Decrease Algorithms, by Dah-Ming Chiu and Raj Jain, DEC Technical Report TR-509, Digital Equipment Corporation, August 1987; and Congestion Avoidance in Computer Networks with a Connectionless Network Layer, Part IV: A Selective Binary Feedback Scheme for General Topologies, by K. K. Ramakrishnan, Dah-Ming Chiu and Raj Jain, DEC Technical Report TR-510, Digital Equipment Corporation, November 1987.

Having thus described illustrative embodiments of the invention, it will be apparent that various alterations, modifications and improvements will readily occur to those skilled in the art. Such obvious alterations, modifications and improvements, though not expressly described above, are nonetheless intended to be implied and are within the spirit and scope of the invention. Accordingly, the foregoing discussion is intended to illustrative only, and not limiting; the invention is limited and defined only by the following claims and equivalents thereto.

What is claimed as new and desired to be secured by Letters Patent of the United States is:

1. In a network of end systems communicating by means of transmission and reception of digital information packets routed through at least one intermediate system, a method for indicating when the intermediate system is approaching a state of congestion, said method being performed at the intermediate system and comprising the steps of:

A. determining whether the intermediate system is in an overload condition characterized by operation of the intermediate system above an optimal operating level but below a congestion level;

B. if the intermediate system is in the overload condition;
  i. selecting the end systems that are transmitting information packets at rates that are above their respective allocated fair shares; and
  ii. signaling one or more of the selected end systems by setting at the intermediate system a congestion avoidance flag in information packets routed through the intermediate system to one or more of the selected end systems.

2. The method of claim 1, wherein said intermediate system temporarily stores packets to create a queue having a queue length equal to the sum of the number of packets in the queue and the number of packets being serviced by the intermediate system, and wherein the overload condition is determined by determining, over a load averaging interval, an average queue length, that is greater than a first preselected queue length.

3. The method of claim 2, wherein operation of the intermediate system includes cycles of activity, each of which includes a busy period and an idle period, and wherein said load averaging interval includes at least one completed previous cycle of activity.

4. The method of claim 2, wherein the first preselected length is approximately equal to one.

5. The method of claim 1, wherein different streams of traffic comprising information packets are routed through said intermediate system, said method further comprising the step of:

A1. identifying those streams of traffic that are causing the overload condition; and in step (B), setting a congestion avoidance flag only in an information packet that is a constituent of a stream of traffic identified as causing the overload condition.

6. The method of claim 5, wherein a stream of traffic is identified as causing the overload condition if its constituent information packets account for a throughput at said intermediate system, during a traffic measuring interval, that is greater than an allocated share of an estimated throughput capacity of the intermediate system.

7. The method of claim 6, wherein the throughput of the intermediate system as a function of load is characterized by a knee, and the estimated throughput capacity of the intermediate system is set to equal approximately the throughput at the knee.

8. The method of claim 6, wherein the estimated throughput capacity of the intermediate system is determined by setting the estimated capacity of the intermediate system equal to a total intermediate system throughput from all streams of traffic passing through the intermediate system during said traffic measuring interval, and multiplying the estimated capacity by a capacity factor.

9. The method of claim 8, wherein the capacity factor is approximately equal to 0.9.

10. The method of claim 1 wherein the congestion avoidance flag consists of a single bit.

11. In a network of end systems communicating by means of transmission and reception of digital packets routed through at least one intermediate system, a method for indicating when the intermediate system is approaching a state of congestion, said method comprising the steps of:

A. determining at an intermediate system whether the intermediate system is in an overload condition; and B. if the intermediate system is in the overload condition, the intermediate system i. selecting end systems that are transmitted packets at rates that are above their respective fair shares; and ii. signaling selected end systems by including at the intermediate system congestion avoidance information in the packets routed through the intermediate system to one or more of the selected end systems.

12. The method of claim 11, wherein said intermediate system temporarily stores packets to create a queue having a queue length equal to the sum of the number of packets in the queue and the number of packets being serviced by the intermediate system, and wherein the overload condition is determined by determining, over a load averaging interval, an average queue length that is greater than a first preselected queue length.

13. The method of claim 12, wherein operation of the intermediate system includes cycles of activity, each of which includes a busy period and an idle period, and wherein said load averaging interval includes at least one completed previous cycle of activity.

14. The method of claim 12, wherein the first preselected length is approximately equal to one.

15. The method of claim 11, wherein different streams of traffic comprising packets are routed through said intermediate system, said method further comprising the steps of:
   identifying those streams of traffic that are causing the overload condition;
   in step Bi selecting end stations that are associated with the identified streams of traffic; and
   in step Bii, including congestion avoidance information only in packets that are constituents of the streams of traffic identified as causing the overload condition.

16. The method of claim 15, wherein the stream of traffic is identified as causing the overload condition if its constituent packets account for a throughput at said intermediate system, during a traffic measuring interval, that is greater than an allocated share of an estimated throughput capacity of the intermediate system.

17. The method of claim 16, wherein the throughput of the intermediate system as a function of load is characterized by a knee, and the estimated throughput capacity of the intermediate system is set to equal approximately the throughput at the knee.

18. The method of claim 16, wherein the estimated throughput capacity of the intermediate system is determined by (i) setting the estimated capacity of the intermediate system equal to a total intermediate system throughput from all streams of traffic passing through the intermediate system during said traffic measuring interval, and (ii) multiplying the estimated capacity by a capacity factor.

19. The method of claim 18, wherein the capacity factor is approximately equal to 0.9.

20. The method of claim 11, wherein the congestion avoidance information consists of a congestion avoidance flag.

21. The method of claim 11, wherein the congestion avoidance information consists of information about one or more desired operating conditions of the intermediate station.

22. A feedback device, for use in a network of end systems communicating by transmission and reception of digital packets routed through at least one intermediate system, comprising,
   A. means for determining at an intermediate system whether said intermediate system is in an overload condition characterized by operation of the intermediate system above an optimal operating level and below a congestion operating level;
   B. means at said intermediate system for selecting end systems that are operating above their respective allocated fair shares of throughput; and
   C. means for signaling one or more of the selected end systems by setting at the intermediate system a congestion avoidance flag in information packets routed through the intermediate system to one or more of the selected end systems when the intermediate system determines that said intermediate system is in said overload condition.

23. The feedback device of claim 22, wherein said intermediate system temporarily stores packets to create a queue having a queue length equal to the sum of the number of packets in the queue and the number of packets being serviced by the intermediate system, and wherein said means for determining an overload condition further comprises means for comparing average queue length at the intermediate system, averaged over a load averaging interval, to a first preselected queue length.

24. The feedback device of claim 23, wherein operation of the intermediate system includes cycles of activity, each of which includes a busy period and an idle period, and wherein said load averaging interval includes at least one completed previous cycle of activity.

25. The feedback device of claim 23, wherein the first preselected length is approximately equal to one.

26. The feedback device of claim 23 further comprising means for determining that all streams of traffic routed through said intermediate system are causing the overload condition, said means comprising means for comparing the average queue length to a second preselected queue length, longer than the first preselected length.

27. The feedback device of claim 26 wherein the second preselected length is approximately equal to two.

28. The feedback device of claim 22, wherein said means for selecting includes means for identifying streams of traffic that are causing the overload condition said means selecting end systems that are part of the identified streams of traffic.

29. The feedback device of claim 28, wherein said means for identifying streams of traffic as causing the overload condition comprises:
   A11. means for comparing the number of information packets associated with a stream of traffic passing through the intermediate system during a traffic measuring interval with a share of an estimated throughput capacity of the intermediate system allocated to said stream of traffic.

30. The feedback device of claim 29, wherein said means for identifying streams of traffic as causing the overload condition further comprises means for determining the estimated throughput capacity of the intermediate system by measuring a total intermediate system throughput from all streams of traffic passing through the intermediate system during said traffic measuring interval.

31. The feedback device of claim 29, wherein operation of the intermediate system includes cycles of activity, each of which includes a busy period and an idle period, and wherein said means for identifying streams of traffic as causing the overload condition further comprises means for detecting when such cycles of activity begin and end.

32. The device of claim 22 wherein the congestion avoidance flag consists of a single bit.

33. A network of end systems communicating by means of transmission and reception of digital packets routed through at least one intermediate system, the intermediate system including:
   A. means for determining whether the intermediate system is in an overload condition;
   B. means for selecting end systems that are operating above their respective allocated fair shares of throughput; and C. means for signaling one or more of the selected end systems, said means including congestion avoidance information in the packets routed through the intermediate system to the selected end systems.

34. The system of claim 33, wherein the means for signaling sets a congestion avoidance flag.

35. The system of claim 33, wherein the means for signaling includes in the packets information about one or more desired operating conditions of the intermediate station.

* * * * *